Feb. 26, 1952 W. G. SWEETMAN 2,587,243
CUTTING APPARATUS
Filed Oct. 16, 1946 2 SHEETS—SHEET 1
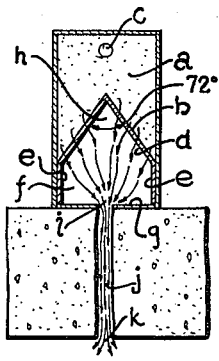
FIG. 1
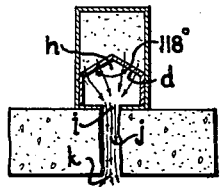
FIG. 2
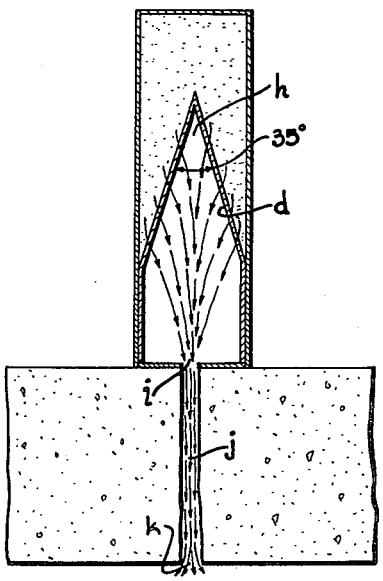
FIG. 3
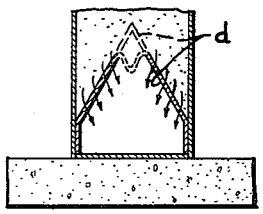
FIG. 4
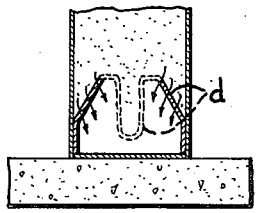
FIG. 5
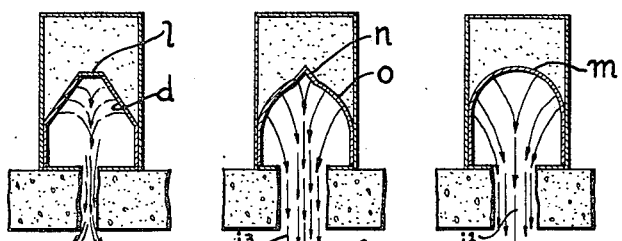
FIG. 7  FIG. 9  FIG. 8
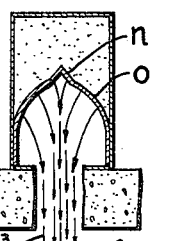
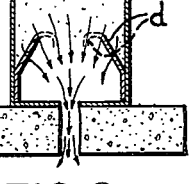
FIG. 6
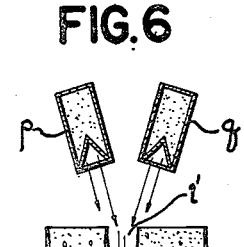
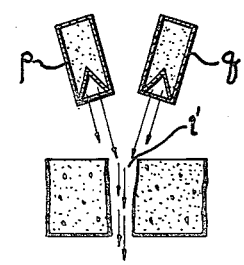
FIG. 10
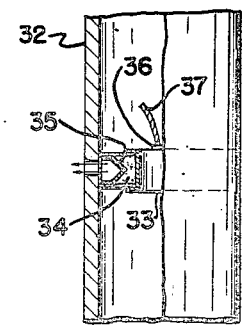
FIG. 19
W. G. SWEETMAN
INVENTOR.
BY
ATTORNEYS Feb. 26, 1952 — W. G. SWEETMAN — 2,587,243
CUTTING APPARATUS
Filed Oct. 16, 1946 — 2 SHEETS—SHEET 2

W. G. SWEETMAN
INVENTOR
BY
ATTORNEYS

Patented Feb. 26, 1952

2,587,243

UNITED STATES PATENT OFFICE 2,587,243

CUTTING APPARATUS

William G. Sweetman, Houston, Tex., assignor of an interest to I. J. McCullough, Los Angeles, Calif., and O. J. McCullough, Houston, Tex., jointly Application October 16, 1946, Serial No. 703,655

1 Claim. (Cl. 102—24)

This invention relates to a new and novel apparatus for producing a gaseous penetrating jet for cutting materials or objects. More specifically, this invention relates to the production and employment of very high velocity gases as the cutting agent, and particularly to apparatus for cutting objects by the use of a chemical charge.

The term "cutting" is used herein as a more or less generic term to include the cutting, severing, piercing or slotting of objects. The objects referred to may include any material such as metal, stone, wood, ore bodies or other earth formations generally.

One of the objects of this invention is to provide an apparatus for producing a gaseous penetrating jet in a novel and effective manner.

Another object is to provide an apparatus for cutting material by the employment of a gaseous penetrating jet of the character described.

Further objects will appear from the detailed description taken in conjunction with the accompanying drawings in which will be described and illustrated a number of the embodiments of this invention; it is to be understood, however, that this invention is susceptible of various embodiments within the scope of the appended claim.

In the accompanying drawings:

Figs. 1 through 10 are diagrammatical views illustrating the principle of this invention;

Fig. 19 is a quarter-sectional elevation of another embodiment in accordance with this invention applied to the cutting of a tubular object from the interior thereof.

Figure 11:
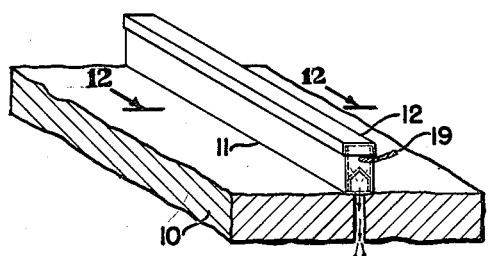
Fig. 11 is a perspective view illustrating an embodiment in accordance with this invention for cutting a steel slab.

Generally stated and in accordance with illustrative embodiments of this invention, a gaseous penetrating jet is produced by detonating a high explosive charge and the resulting gases are converged to a relatively sharp focus, which term "focus" is hereinafter employed to describe what is believed to be the theory of action. It is to be understood, however, that this invention is not to be restricted to any theory, which latter is simply advanced for the purpose of supplementing the disclosure hereinafter set forth.

The detonating high explosive charge is hollowed and the hollow is of generally concave form. Upon detonation of such a hollowed charge, the resulting gases are directed generally along an axis in a manner well known in the art. However, in accordance with illustrated embodiments of this invention, there is interposed along such axis and in the path of the gases, means which is rupturable by the gases and this means is constructed and arranged to converge the gases to a relatively sharp focus beyond that means. The converging means employed may be of reentrant form, which may be in the form of a liner corresponding to and lying against the hollow of the charge. The cross-section of the converging means may be generally of a conic section, viz., an angle, an ellipse, or a frustrum thereof. This converger has such an angle and is made of such a material and thickness of material that it will rupture upon detonation of the charge in a manner so as to deform the converger in the direction of the issuing gases in order to converge those gases to a relatively sharp focus; and by variation of the angle of the converger the position of the focus with reference to the charge or the apex of the converger may be varied to obtain a desired focal length for the resulting jet of gases.

The construction heretofore described is such as to not only cause the converging means to converge resulting gases to a relatively sharp focus, but to actually cause penetration of the gases through the converger so that the resulting jet will pass beyond the converging means rather than have the latter precede it, as in the case of the propelling of a projectile. Moreover, beyond the focus the gases will be maintained in the form of a narrow column for an extended distance beyond the focus.

In the apparatus for cutting materials, the jet or column, formed as heretofore described, is directed onto the material to perform its cutting function by penetrating the material to be cut or severed. The cutting is, therefore, primarily performed by the jet and not by a projectile propelled along the travel of the jet; for in actual cutting operation, the converger is preceded by the jet which ruptures this converger.

In the illustrative embodiments of this invention, a closed housing extends from the converging element in the direction of the jet and it is from this housing that the jet is directed. This housing spaces the converger from the closed front and encloses the converger. The housing may also enclose the chemical charge, although that is not necessary. Any suitable initiator may be employed to detonate the charge.

Referring now to Figs. 1 through 10, which illustrate the principles of this invention, and first to Fig. 1: a chemical charge of detonating material is shown at $a$, and this charge is hollowed, as shown at $b$, and is arranged to be detonated by an initiator $c$. Lying against the hollow $b$ is an element $d$ which may be formed of sheet metal, such as mild steel, copper or brass. The element $d$ has a sealing housing composed of side walls $e$ and end walls $f$ (only one being shown) and a front wall $g$. In this embodiment the element $d$, which has been designated descriptively as the "converging means" or "converger," is in the form of an angle with the angle between the sides designated by $h$. With proper choice of the angles and of the thickness of material of the converger, the operation is believed to be as follows: On detonation of the charge, the resulting gases will be directed generally along an axis, downwardly in the figures. These gases will deform the converger and rupture the same as shown in Figs. 4, 5 and 6. This causes these gases, in turn, to be converged, as shown in the dotted lines, as a jet to a relatively sharp focus at $i$, located in Figs. 1, 2 and 3 at the front wall $g$. The gases then continue in narrow column $j$ for an extended distance beyond the focus before they begin to diverge, as shown at $k$. The form and length of the jet column will depend upon the angle $h$ of the converger, as shown in Figs. 1, 2 and 3. These show that as the angle $h$ is decreased the focal length from the apex to the focus $i$ and the column length is increased. With each increase in angle the distance of the converger from the front wall is increased because of the increase in focal length.

In Fig. 7 the converger is truncated and cut off, as is also the charge hollow, so that deformation of the converger by the gases is modified to more readily collapse, resulting in a jet column of greater sustained length. The end of the converger may be closed by a layer $l$ of paper to keep the charge in place.

In Fig. 8 the converger is made of a domed part $m$, which latter may be of parabolic form. In such an embodiment the jet column $j^1$ will be thicker than in the other embodiments.

In Fig. 9 the converger is made up of an angular part $n$ and of a domed part $o$, the former of which results in a narrow jet column $j^2$ and the latter in a wider column $j^3$.

In Fig. 10 a plurality of units $p$ and $q$ are arranged along axes intersecting at their focii $i^1$. These units may be of the forms previously shown and described.

The jet produced as described above may be employed for various purposes.

The method of cutting contemplated by this invention employs, as the primary cutting agent, gases traveling at very high velocities which, in accordance with this invention, are caused to be concentrated and focussed in the form of a relatively narrow beam or jet on the points or along the line of the cut to be made with the result that the cutting action is effected primarily by the gases traveling at very high velocity and produces a sharp cut with minimum damage to the areas of the object adjacent the points or line of the cut.

Gases traveling at velocities in excess of 1000 meters per second, and may be at very much higher velocities, are employed for cutting objects in accordance with this invention. Such gases may be generated by the detonation of chemical substances of the type generally designated as "high explosives" or "detonating explosives" which, upon detonation, decompose very rapidly to generate gaseous decomposition products which are capable of attaining extremely high velocities, particularly when suitably controlled and directed in accordance with the method of this invention. Numerous chemicals of this character are available for use in accordance with this invention including such materials as penta-erythritol tetranitrate (PETN), Tetryl, Pentolite, (50% PETN and 50% TNT), trinitrotoluene (TNT), Amatol, Cyclonite, Tetrytol (60% Tetryl and 40% TNT), and many others well known to those familiar with such detonating chemicals.

By way of an example, a detonating chemical composition comprising a mixture of PETN and TNT, when used in accordance with this invention, will develop a wave of gases which travel at velocities of over 10,000 meters per second at 200,000 atmospheres of pressure and approximately 3900 degrees centigrade absolute temperature. It should be noted that the temperature of the gases is a relatively unimportant factor in the cutting action of the gases, since at the extremely high velocities involved, the time interval involved in making a cut of any desired depth is so short as to render the temperature effect relatively negligible.

The detonating chemicals may be employed in cast or compressed solid form, but are employed preferably in the form of plastic or gelatinous masses, which may be readily molded to the desired form for use in accordance with this invention, and may be used individually or as blends of two or more of them in suitable proportions, and may include suitable detonatable plasticizers.

Generally speaking, the method of this invention may be accomplished by preforming a charge of a detonating chemical of the type described above to a configuration substantially corresponding to the line of the cut to be made in an object, and by controllably causing the major proportion of the gases generated by detonation of the charge to be concentrated and focussed relatively sharply on the line of the cut.

The concentration, converging and focussing of the generated gases is effected, as above described, by applying to a face of the preformed charge directed toward the object to be cut, a concave control member, which has been termed a "converger," and it is of predetermined form which is preferably angular in cross-section but which may be arcuate, or a combination of both forms, as shown above.

The size of the angle or arc enclosed by the converger determines the shape of the jet or beam of gases which will be directed toward the object to be cut and the stand-off distance from the inner end of the wave developer at which the gases will be brought to the desired focus and this, in turn, will determine the optimum spacing or spacing of the charge from the object to be cut. The size of this angle will usually be less than 180°. Furthermore, the shape of the converger will also determine the optimum distance over which the gases may be maintained in effective jet or beam form, and therefore, the depth of the cut which may be made by the gases. Thus, for a given angle in the converger, the gases will be caused to come to a focus at a predetermined distance or stand-off from the base or apex of the converger and will travel a predetermined distance in a relatively concentrated beam or jet before scattering or dissipation of the gases. Once the gases begin to scatter or diverge from the focal point or line, the effectiveness of the cutting action is reduced extremely rapidly. Thus, when it is desired to cut through a steel plate, for example, with minimum penetration of any material behind the plate, by selecting a suitable relatively wide angle for the wave developer, the explosive gases may be caused to be focussed in suitable cutting concentration on the face of the plate and to retain their effective narrow jet or beam form for a distance sufficient only to penetrate through the plate, and to then scatter or diverge sharply immediately after passing the rear face of the plate, with an immediate loss of penetrating power such that the cutting action of the gases on any material immediately behind the plate will be relatively negligible. On the other hand, by selecting a different and narrower angle for the converger, the gases can be brought to a focus and caused to travel in narrow beam form of cutting concentration and velocity a greater distance than the thickness of the plate, so as to pass through the plate and penetrate a predetermined distance into the material behind it.

In many respects, the principles involved in the shaping of the converger to bring the gases to a focus at a predetermined distance from the end of the charge and to determine the shape of the jet or beam of gases, are quite analogous in function and in the mathematical calculations involved to well known optical principles, in that the converger may be likened to a concave mirror or lens, and the actions of the gases passing through the converger from the charge may be made to correspond closely in many respects to the actions of a beam of light rays passing through a concave lens or reflected from a concave mirror. Accordingly, in view of the analagous relationship, optical terms such as "focus," "focal length," "beam," etc., are employed in connection with the description of this invention, and their meaning will, therefore, be clearly evident as so employed.

The convergers employed in accordance with this invention are preferably constructed of thin metal, such as steel, brass, copper and the like, or of glass or rigid plastic composition which have been preformed or molded to the desired shape. The wall thickness of the convergers is a function of the depth of the cut to be made, that is, the distance from the focus of the beam through the object to be cut, and will, therefore, be varied in accordance with the requirements of each use. In most circumstances the wall thickness of the converger will range from less than 1% to about 10% of the depth of the cut. It is important to note that the convergers employed in accordance with this invention are not in any sense projectiles, and are normally disintegrated or pierced by the gases leaving the charge without forming, or functioning as, projectiles in the ordinary sense of this word.

I have also discovered that in order to assure the proper development of an effective cutting beam of gases, the gases leaving the converger should preferably be guarded from interference by any extraneous solid or liquid matter until the gases attain the desired focussed form, for until the gases reach their point or line of focus, the interposition of any extraneous solid or liquid matter in their paths will deflect and dissipate the gases so as to prevent their concentration, converging and focussing into an effective cutting beam. The guarding of the gases leaving the converger is preferably accomplished by enclosing the converger within a shielding housing, constructed of any suitable metal or rigid plastic composition, extending in the direction of the desired path of the gases and terminating at a distance from the end of the converger which is substantially the predetermined point or line of focus of the beam of gases. The outer end of the shielding housing may be closed, if necessary, to exclude any extraneous liquid or solid matter from the interior thereof. Since this end closure will be at substantially the focus of the beam of gases, it can no longer interfere with the effective cutting action of the beam and will be cut thereby as, in effect, a portion of the object against which the gases are primarily directed.

Figure 12:
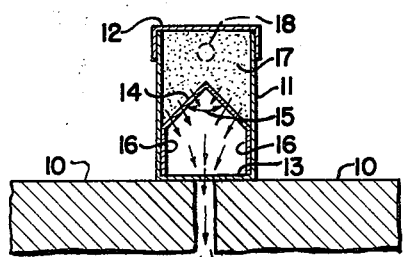
Fig. 12 is an enlarged cross-sectional view along line 12—12 of Fig. 11.

Figs. 11 and 12 illustrate particularly the application of this invention to the making of an elongated straight cut through a flat surfaced body 10, such as a steel slab. As illustrated, the structure employed for making such a cut comprises an elongated narrow rectangular casing 11, whose overall length is approximately that of the cut to be made, and whose width is generally somewhat greater than that of the desired cut. The ends of the casing are closed and one of the long edges of the casing is provided with a tightly fitting removable cover 12. The other long edge of the casing is also closed by a wall 13, which may be dispensed with in the absence of extraneous liquid or solid matter in the vicinity of the cut which might otherwise enter the interior of the casing. Casing 11 is preferably constructed of thin sheet metal, but may be constructed of any other suitable material of sufficient rigidity to maintain the desired form.

A converger 14, preferably in the form of a V-shaped trough, is disposed longitudinally within the casing extending from end to end thereof, and having the opening of the trough facing toward wall 13. The converger is positioned within the casing, at a predetermined depth, relative to wall 13, depending upon the size of the angle 15 between the arms of the converger, for as noted previously, this depth will be approximately the focal length of the beam of gases developed by converger 14, as measured from the apex of the converger. For ease in assembly of the cutting device, the outer edges of converger 14 are preferably provided with spacer members 16—16 extending parallel to the walls of casing 11 and in close sliding relation thereto, the length of spacer members 16 being such that when their outer ends contact the inner face of wall 13, upon insertion of the converger in casing 11, the converger will be spaced within casing 11 at the desired distance from wall 13. If desired, spacing members 16 may be eliminated and the converger fixed in the desired position within casing 11 by soldering, welding, or otherwise firmly fastening the edges of the converger to the interior of the side walls of casing 11. As previously noted, converger 14 is preferably constructed of thin sheet material, the thickness of which is a function of the depth of the cut to be made.

The interior of casing 11 behind converger 14 is filled with a body 17 of a suitable detonating chemical, of the kind described above, of sufficient mass to produce the desired cutting action. The detonating chemical is preferably in plastic or gelatinous form so that when placed in casing 11, it may be closely packed about the rear face of the converger and assume its shape. The body of the detonating chemical may, if desired, be preformed, as by casting, pressing or molding, to the shape of the portion of the interior of casing 11 behind the converger. After body 17 of the detonating chemical is in place, cover 12 is applied to close casing 11.

A detonating means 18, of any suitable or conventional form adapted to bring about the detonation of the body of detonating chemical, is inserted through one end of casing 11 into body 17 and is connected, to any suitable means (not shown) for igniting the detonating means, such as an electrical ignition means, for example, by an electrical lead 19.

To effect the cutting of slab 10, casing 11, assembled as described and containing the body of the detonating chemical, is merely placed against the surface of the slab along the line of the cut to be made and the body of chemical detonated. The gases released by the detonation of the chemical will discharge through converger 14 and will be caused by the shape thereof to be concentrated and focussed into the form of a relatively thin beam, which will have its focus along a straight line extending for the full length of the converger intermediate the side edges thereof, and at substantially the outer surface of the slab, as indicated more or less diagrammatically by the arrows in Fig. 12 particularly. The relatively sharp beam or column of gases thus developed will travel at very high velocity and will produce a cut through slab 10 extending substantially the full length of the converger, and the cut will be remarkably clean throughout its length and unaccompanied by any appreciable shattering or disintegration of the slab material adjacent the line of the cut.

As previously noted, for cutting various thicknesses of material, the focal length of the beam may be correspondingly varied by varying angle 15 of the converger. The mass of detonating chemical employed will also be varied depending upon the depth of the cut to be made.

Merely by way of an example, in order to cut through a slab of high tensile steel four feet long and one inch thick, the embodiment described above and illustrated in Figs. 1 and 2 will employ a casing four feet long and approximately three-quarters of an inch wide between the side walls. Body 17 of the detonating chemical will consist of about 165 grams of Pentolite, for example, per foot of cut. Converger 14, of mild steel, will have a thickness of approximately three one-hundredths (0.03) inch and angle 15 thereof will be approximately 72 degrees. For this angle the distance from the outer end of the converger to the face of slab 10 will be approximately one-half inch.

Figure 13:
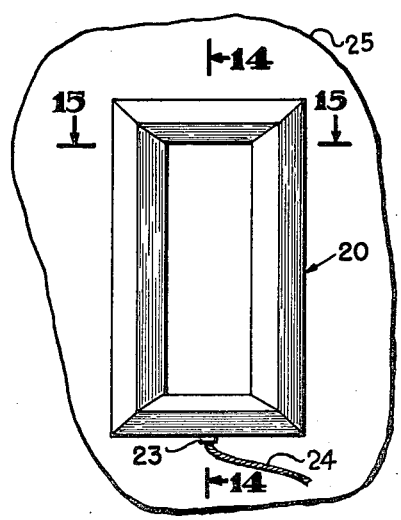
Fig. 13 is a plan view of another embodiment in accordance with this invention applied to cutting out ore from a mine wall.
Figure 14:
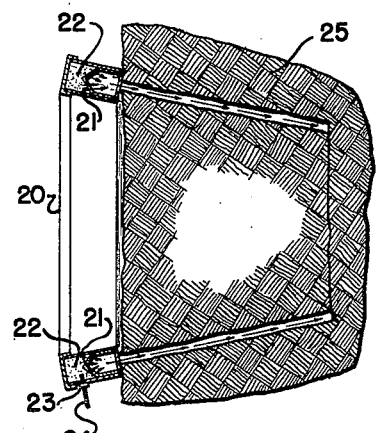
Fig. 14 is a longitudinal sectional view taken along line 14—14 of Fig. 13.
Figure 15:
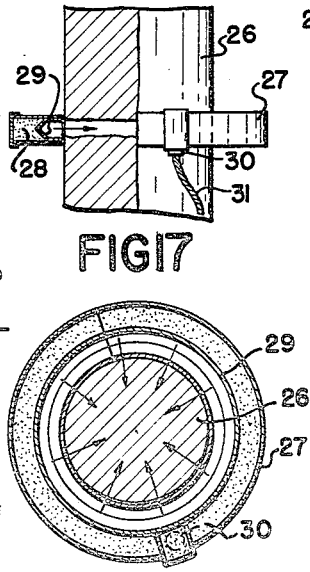
Fig. 15 is a horizontal sectional view taken along line 15—15 of Fig. 13.

Figs. 13, 14 and 15, illustrate another embodiment in accordance with this invention applied particularly to the cutting of blocks of ore from an ore face 25 in a mine. In this embodiment, a container 20, of generally rectangular pyramidal configuration, is constructed by employing four containers, each similar in form and internal construction to container 11 of the previously described embodiment, as the sides of a rectangle. The edges of each of the sides facing the ore body are tilted inwardly to produce a hollow pyramidal structure, the sides of which converge toward ore face 25. Each of the sides of container 20 contains a converger 21 similar in shape to converger 14 of Figs. 11 and 12, which are joined together at the corners of the structure to form a continuous converger rectangular in outline. The interior of container 20 behind the converger is packed with a body 22 of a suitable detonating chemical which is thus preformed to a configuration of the line of the cut to be made in ore face 25. A conventional detonating means 23 is inserted through one side of container 20, and connected by a suitable electrical cable 24 to a suitable electrical igniting means (not shown).

When the structure is placed against ore face 25 and the detonating chemical 22 set off, the high velocity gases will be caused to be concentrated and focussed into a sharp beam which will be generally of hollow rectangular shape in cross-section, and will cause the portions of the beam forming each of the sides of the rectangle to cut through the ore body in converging directions, as illustrated particularly in Figs. 14 and 15, and cut a block of material from the ore face of generally pyramidal form.

The depths of the cuts and, therefore, the thickness of the block cut out thereby, will be determined, as previously described, by the angle employed in the converger, and upon the mass of detonating chemical employed. The angle and the mass of chemical employed being such as to cause the beam of gases to travel the desired distance in a relatively focussed form. The converging arrangement of the side beams is employed preferably to permit the block, cut out as described, to be easily removed from the ore face. The spacing of the converger from the ore face will be such as to cause the beam of gases to strike the ore face on substantially the focal line of the beam.

In this embodiment, the cutting action of the focussed beam of gases, will, as in the previous embodiment, produce in the ore body a sharp, clean cut having the general configuration of container 20 and the contained body of detonating chemical.

In this embodiment also, relatively large blocks of ore may be cut out by employing a relatively small quantity of detonating chemical. For example, to cut a block two feet wide, three feet long and two feet thick, of the shape shown, will require only about 3000 grams of Pentolite, for example, enclosed in a container, having side walls of the same length as the sides of the block and each about one and one-half inches thick, and provided with a converger of mild steel approximately seven one-hundredths inches (0.07) thick, having an angle of approximately 35 degrees, the outer end of which is spaced about three inches from ore face 25.

With this embodiment, the time consuming, laborious and dust creating methods, and the complicated and expensive drilling and shooting apparatus heretofore employed, are eliminated and replaced by a very simple, highly efficient method and apparatus which requires very little time and material for effective results.

Figure 16:
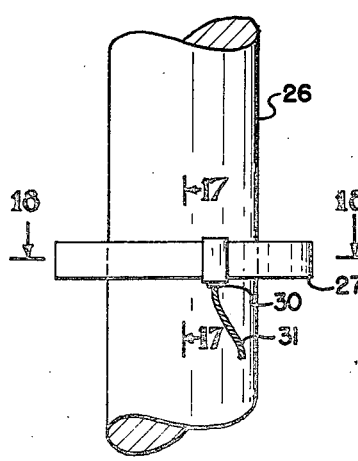
Fig. 16 is an elevational view of still another embodiment in accordance with this invention applied to the cutting of cylindrical objects.
Figure 17:
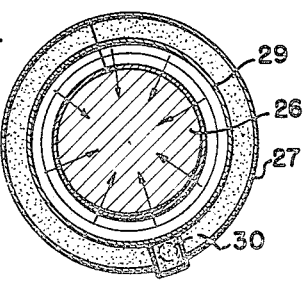
Fig. 17 is a quarter-sectional elevation along line 17—17 of Fig. 16.
Figure 18:
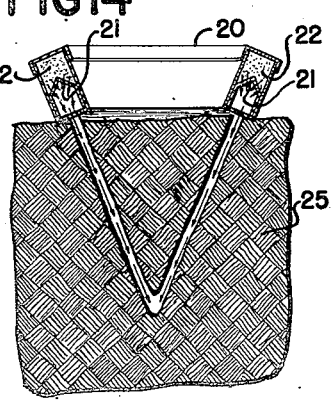
Fig. 18 is a cross-sectional view along line 18—18 of Fig. 16.

Figs. 16, 17 and 18, illustrate still another embodiment in accordance with this invention applied particularly to the cutting in two of a cylindrical solid steel body 26. In this embodiment, a container 27 is preformed into the shape of a narrow annulus containing a body of detonating chemical 28 and a converger 29 of the same annular configuration. This preformed structure is arranged to encircle the periphery of body 26 and is supplied with a detonating means 30 connected by an electrical lead 31 to the ignition means (not shown).

Again, as in the previous embodiments, the angle employed for the converger and its spacing from the object are such as to cause the generated gases to be focussed, in this case, into a thin annular beam, the sections of which converge substantially uniformly toward the center of body 26, as indicated by the arrows shown particularly in Figs. 17 and 18.

With this embodiment, a steel bar six inches in diameter can be readily severed by the employment of only about 1500 grams of Pentolite, preformed into an annulus approximately two inches thick, measured parallel to the axis of body 26, employing a mild steel converger approximately fifty-six one-thousandths inches (0.056) thick, having an angle of about 76 degrees, and having its outer edges spaced approximately one inch from the periphery of body 26. The resulting cut will be closely comparable in sharpness to one made by an oxy-acetylene torch through a similar body.

In Fig. 19 an embodiment is illustrated for severing a hollow tubular body 32 by directing an annular cutting jet against the interior wall thereof. In this case, a container 33 of annular form comparable to container 27 of Figs. 16, 17 and 18, and containing a chemical charge 34, encloses a wave developer 35 which is directed toward the inner wall of body 32. The charge is provided with a conventional detonating means 36 connected by a lead 37 to an igniting means (not shown).

As one example of the application of the embodiment of Fig. 19, a steel pipe five and one-half inches in diameter, having a wall thickness of about one-half inch, may be severed by making container 33 one-half inch wide containing about 115 grams of Pentolite, and employing a converger of mild steel approximately thirty-six one-thousandths (0.036) inch thick, having an angle of 72 degrees, the edges of the converger being spaced approximately three-eighths (⅜) of an inch from the inner wall of the pipe. This will produce a sharp cut approximately one-eighth (⅛) inch wide entirely through the pipe wall.

From the foregoing, it will be understood that cuts of any desired configuration may be made in various bodies, with substantially equal effectiveness, by employing a charge of detonating chemical which has been preformed to the configuration of the cut to be made, and by employing an angular converger of similar lineal configuration to cause the generated gases to be concentrated into a focussed beam of very high velocity and of generally corresponding configuration, and to strike the object at substantially the focal line of the beam.

It will be seen from the foregoing that the apparatus employed is of very simple construction and may be made of very cheap materials, so that its destruction in performance of the desired cutting action is a relatively negligible factor in the cost of the cutting operation.

It will be understood that various alterations and modifications may be made in the details of this invention without departing from the scope of the appended claim but within the spirit of this invention.

What I claim and desire to secure by Letters Patent is:

Apparatus for producing a gaseous penetrating jet, effective for cutting metal comprising a high explosive charge having an angular hollow groove in the face thereof adapted to be directed toward the object to be cut and conforming in configuration to the line of the desired cut, a converger conforming in angular shape and configuration to said hollow groove and seated therein, the interior angle of said hollow groove and of said converger being approximately 72° and said converger being constructed of metal having a wall thickness of approximately 0.036 inch whereby said converger is disintegrated upon detonation of said charge and a sharp narrow cut through the metal produced.

WILLIAM G. SWEETMAN.

REFERENCES CITED

The following references are of record in the file of this patent:

UNITED STATES PATENTS

| Number | Name | Date |
|---|---|---|
| 2,144,208 | Van Meter | Jan. 17, 1939 |
| 2,399,211 | Davis et al. | Apr. 30, 1946 |
| 2,407,093 | Mohaupt | Sept. 3, 1946 |
| 2,409,848 | Greulich | Oct. 22, 1946 |
| 2,415,814 | Davis et al. | Feb. 18, 1947 |

OTHER REFERENCES

Explosives Engineer, July-August, 1945, pages 160–163.

The Oil Weekly for July 8, 1946, pages 56 and 58.

Journal of Applied Physics, volume 19, pages 563–582, June, 1948.